United States Patent [19]
Tomita

[11] Patent Number: 5,990,477
[45] Date of Patent: Nov. 23, 1999

[54] APPARATUS FOR MACHINING, RECORDING, AND REPRODUCING, USING SCANNING PROBE MICROSCOPE

[75] Inventor: Eisuke Tomita, Chiba, Japan

[73] Assignee: Seiko Instruments Inc., Japan

[21] Appl. No.: 09/057,809

[22] Filed: Apr. 9, 1998

[51] Int. Cl.$^6$ .................................................. H01J 37/04
[52] U.S. Cl. ........................................................ 250/306
[58] Field of Search .............................. 250/306, 440.11, 250/442.11; 73/105

[56] References Cited

U.S. PATENT DOCUMENTS

| | | | |
|---|---|---|---|
| 5,641,896 | 6/1997 | Karrai | 250/306 |
| 5,767,514 | 6/1998 | Lloyd | 250/306 |

FOREIGN PATENT DOCUMENTS

| | | |
|---|---|---|
| 441399A2 | 8/1991 | European Pat. Off. . |
| 195 10 368 | 11/1995 | Germany . |
| 195 24 907 | 1/1997 | Germany . |

OTHER PUBLICATIONS

Patents Abstracts of Japan, vol. 017, No. 596 (P–1636) Oct. 29, 1993.
Patents Abstracts of Japan, vol. 015, No. 079 (P–1170) Feb. 25, 1991.

Primary Examiner—Kiet T. Nguyen
Attorney, Agent, or Firm—Adams & Wilks

[57] ABSTRACT

A machining, recording, and reproducing apparatus using a scanning probe microscope comprising: a probe equipped with a probe tip at its front end, a vibration application portion consisting of a piezoelectric vibrating body and an AC voltage-generating portion, a vibration-detecting portion consisting of a quartz oscillator and a current/voltage amplifier circuit, a coarse displacement device for bringing the probe close to a surface of a sample, a sample-to-probe distance control device consisting of a Z fine displacement element and a Z servo circuit, a two-dimensional scanning device consisting of an XY fine displacement element and an XY scanning circuit, and a data-processing device for converting a measurement signal into a three-dimensional image. The probe is held to the quartz oscillator by spring pressure of a resilient body.

28 Claims, 5 Drawing Sheets

APPARATUS FOR MACHINING, RECORDING, AND REPRODUCING, USING SCANNING PROBE MICROSCOPE

BACKGROUND OF THE INVENTION

The present invention relates to apparatus for machining, recording, and reproducing, using a scanning probe microscope that utilizes a quartz oscillator to control the position of a probe.

Known methods for position control in a scanning probe microscope include a method consisting of detecting a tunneling current, a method consisting of detecting evanescent light, and a method consisting of detecting an atomic force. One form of scanning probe microscope making use of a tunneling current for the control of a probe is a scanning tunneling microscope (STM). One form of scanning probe microscope in which evanescent light is employed for the control of a probe is a photon STM. However, limitations are imposed on samples capable of being measured. Therefore, principal applications lie in an atomic force microscope (AFM) where an atomic force is used to control the position of a probe and in a near-field scanning optical microscope (NSOM). One method of detecting an atomic force consists of detecting displacements of a probe by means of laser light. Another method makes use of variations in the current generated by a quartz oscillator.

A scanning probe microscope in which laser light is used to detect displacements of a probe is disclosed, for example, in Patent Unexamined Publication No. 50750/1994, entitled, "Scanning Microscope Including Force-Detecting Means", by Robert Erik Betzig. An example of a scanning probe microscope in which a quartz oscillator is used to detect displacements of a probe is disclosed in *App. Phys. Lett.* 66(14), 1995, pp. 1842–1844, by Kaled Karai et al. These instruments are outlined below.

FIG. 2 is a schematic view of the prior art "scanning probe microscope using laser light". The tip of an optical fiber 310 is machined into a tapering form 70. A sample stage 20 is placed on an XYZ stage 50. A sample 30 is set on the sample stage. The optical fiber probe 70 is vibrated parallel to the sample surface, using a fine displacement element 40. A horizontal force from the sample surface, or a shear force, acts on the tip of the probe. Thus, the state of the vibration of the probe varies. To measure the state of vibration of the probe 70, laser light (not shown) used for position control is directed at the tip, and the shadow of the probe 70 is detected by a lens 90 and a photodetector 30. The distance between the sample surface and the tip of the probe is controlled, using the fine displacement element 40, so that the shear force is kept constant, i.e., the rate at which the amplitude or phase varies is kept constant. The shear force drops rapidly with the distance from the sample. Utilizing this, the distance between the sample surface and the tip of the probe is kept constant on the order of nanometers. The sample surface is raster-scanned, using the XYZ fine displacement element 40. In this way, the topography of the sample surface can be measured on the order of nanometers. Under this condition, an electric field, magnetic field, electric current, light, heat, pressure, or the like is applied to the sample surface. Thus, the sample surface can be machined or processed. In addition, information can be recorded by forming a distribution of machining on the sample surface, using a sample-moving means. In addition, the information can be reproduced by successively measuring the information machined into the surface by the use of the sample-moving means.

FIG. 3 is a schematic view of main portions of the prior art "scanning probe microscope using a quartz oscillator". Indicated by 400 is an optical fiber probe, and indicated by 410 is a quartz oscillator. The optical fiber probe is bonded to the quartz oscillator with adhesive. The quartz oscillator is made to resonate, using a piezoelectric device (not shown) for vibrations. Vibration of the quartz oscillator vibrates the optical fiber probe. As the tip of the probe approaches the sample, a horizontal force from the sample surface, or a shear force, acts on the tip of the probe. Thus, the state of the vibration of the probe varies. The state of vibration of the quartz oscillator is measured by measuring electric charge generated by a piezoelectric effect of quartz. The distance between the sample surface and the tip of the probe is controlled, using a piezoelectric scanner (not shown) so that the shear force is kept constant, i.e., the rate at which the amplitude or phase varies is kept constant. The shear force drops rapidly with the distance from the sample. Utilizing this, the distance between the sample surface and the tip of the probe is kept constant on the order of nanometers. The sample surface is raster-scanned, using an XYZ fine displacement element (not shown). In this manner, the topography of the sample surface can be measured on the order of nanometers. Under this condition, an electric field, magnetic field, electric current, light, heat, pressure, or the like is applied to the sample surface. Thus, the sample surface can be machined or processed. In addition, information can be recorded by forming a distribution of machining on the sample surface, using a sample-moving means. In addition, the information can be reproduced by successively measuring the information machined into the surface by the use of the sample-moving means.

The prior art scanning probe microscope described above has the following disadvantages. In the scanning probe microscope using laser light, it is directed at the sample surface near the tip of the optical probe, and an image (shadow) of the tip of the probe is detected from the reflected light to detect the shear force. Therefore, the amount of reflected light is readily affected by the topography of the sample surface and by the reflectivity. Hence, it is difficult to measure the amplitude of vibration, and it is difficult to precisely measure the surface topography. Furthermore, it is not easy to align the laser light and so the data reproducibility has posed problems. Consequently, the machining accuracy and recording accuracy have problems. It has been difficult to reproduce the information.

In the scanning probe microscope using a quartz oscillator, the portion where the quartz oscillator and the optical fiber are adhesively bonded together tends to be a microscopic region (e.g., a square region about 100 μm square). It is difficult to perform the bonding operation. Furthermore, the characteristics of the quartz oscillator device are easily affected by the amount of adhesive, the hardness, the location at which they are bonded, and other factors. Thus, it is difficult to obtain an oscillator sensor with high reproducibility. For these reasons, it has been difficult to use the instrument in industrial applications. Where the probe is replaced, the quartz oscillator must also be replaced. This gives rise to an increase in the cost. In addition, reproducible surface topography measurement has been impossible to perform. Consequently, the machining accuracy and recording accuracy have problems. It has been difficult to reproduce the information.

SUMMARY OF THE INVENTION

An apparatus for machining, recording, and reproducing, using a scanning probe microscope in accordance with the present invention uses a scanning probe microscope having a probe equipped with a probe tip at its front end, a vibration application portion consisting of a piezoelectric vibrating body and an AC voltage-generating means, a vibration-detecting portion consisting of a quartz oscillator and a current/voltage amplifier circuit, a coarse displacement means for bringing the probe close to a surface of a sample, a sample-to-probe distance control means consisting of a Z fine displacement element and a Z servo circuit, a two-dimensional scanning means consisting of an XY fine displacement element and an XY scanning circuit, and a data-processing means for converting a measurement signal into a three-dimensional image. This is characterized in that the probe is held to the quartz oscillator by spring pressure of a resilient body. Because of this structure, an apparatus for machining, recording, and reproducing is provided, using the scanning probe microscope, the apparatus being characterized in that it can measure surface topography with good reproducibility, have good machining accuracy and recording accuracy, and can easily reproduce information.

DETAILED DESCRIPTION OF THE INVENTION

Figure 1:
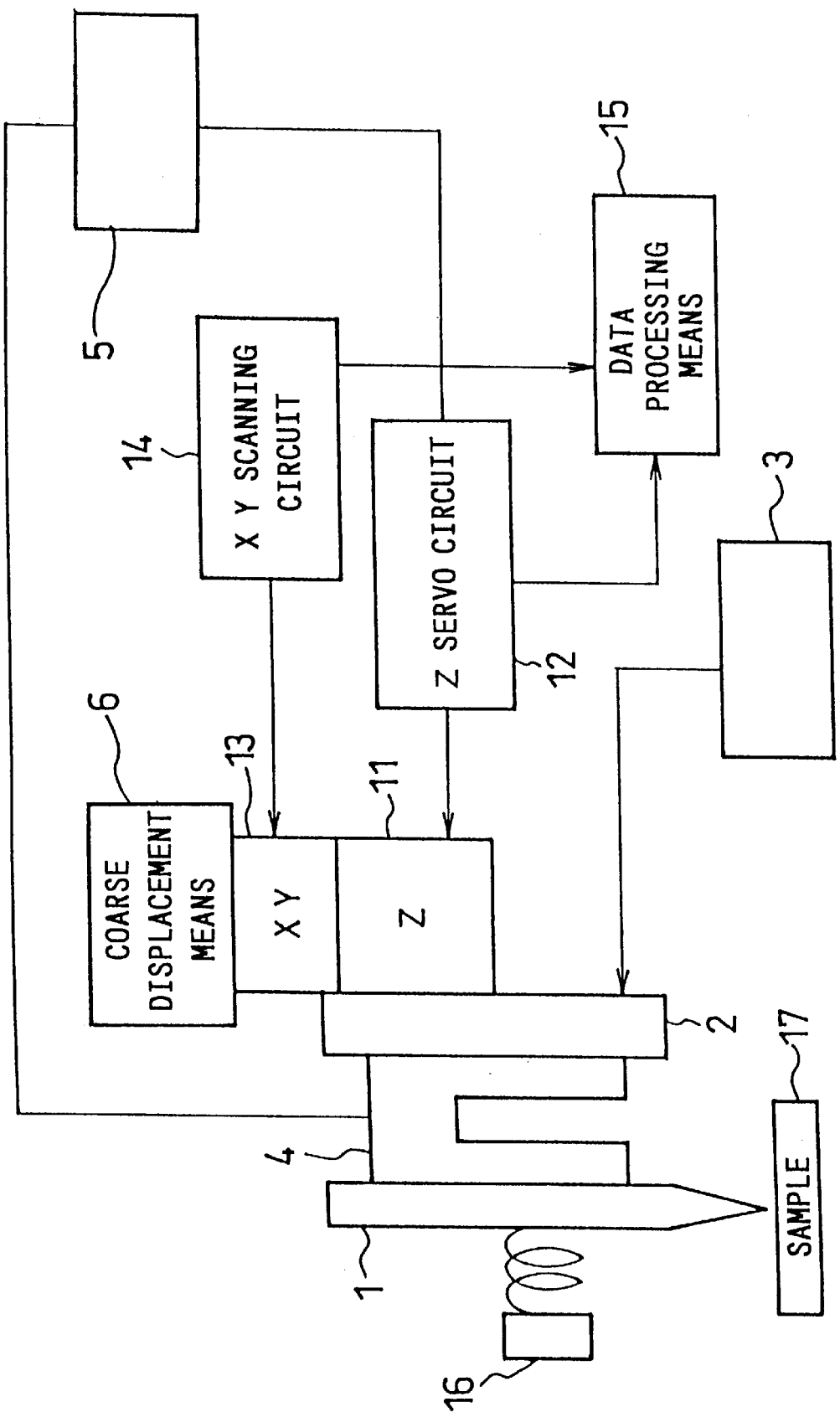
FIG. 1 is a schematic view of a machining, recording, and reproducing apparatus using a scanning probe microscope in accordance with the present invention.
Figure 2:
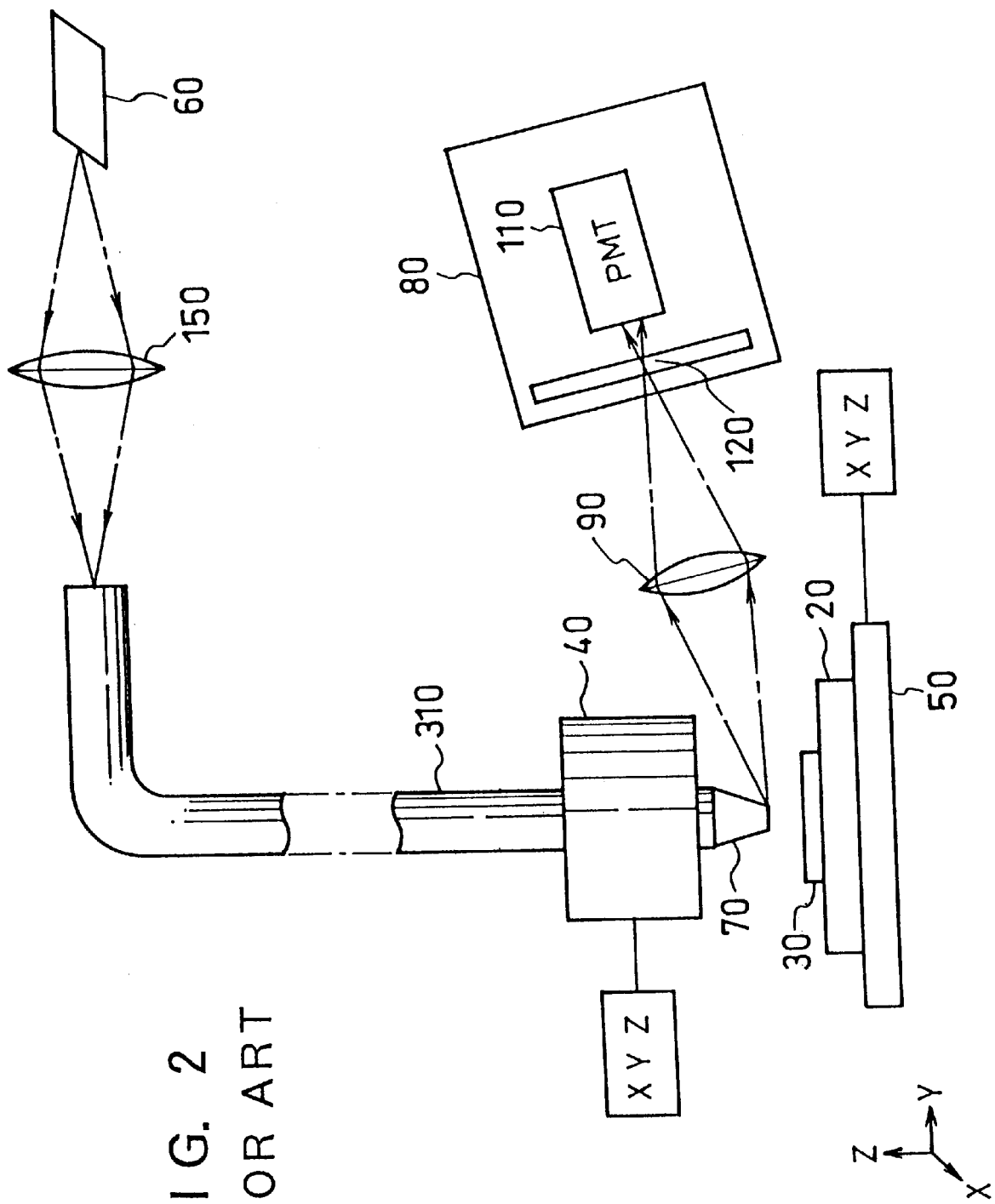
FIG. 2 is a schematic view of the prior art scanning probe microscope using laser light.
Figure 3:
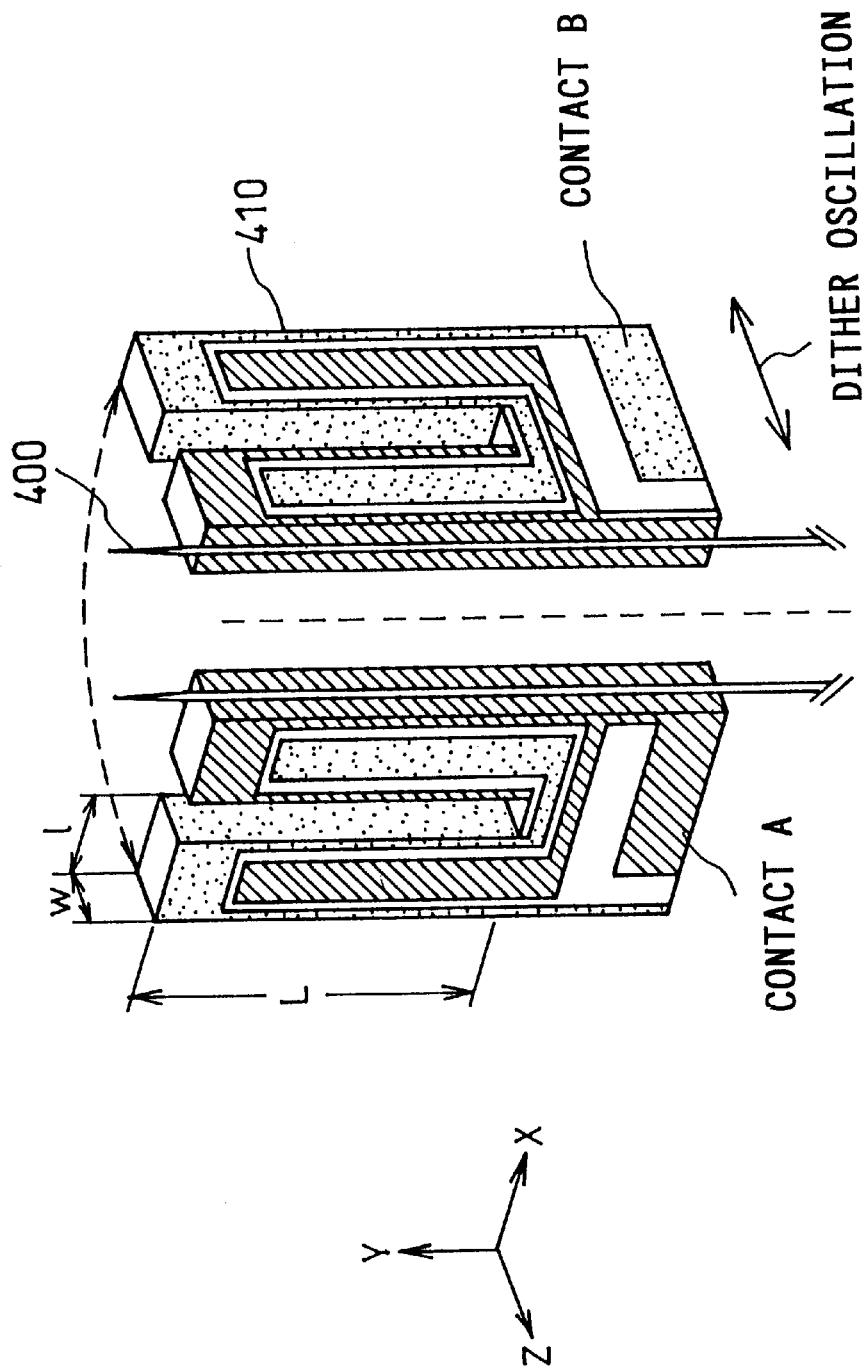
FIG. 3 is a schematic view of the prior art scanning probe microscope using a quartz oscillator.

FIG. 1 is a schematic view of an apparatus for machining, recording, and reproducing, using a scanning probe microscope in accordance with the present invention.

The apparatus for machining, recording, and reproducing, using the scanning probe microscope in accordance with the present invention comprises a probe 1, a vibration application portion consisting of a piezoelectric vibrating body 2 and an AC voltage-generating means 3, a vibration-detecting portion consisting of a quartz oscillator 4 and a current/voltage amplifier circuit 5, a coarse displacement means 6 for bringing the probe close to the sample surface, a sample-to-probe distance control means consisting of a Z fine displacement element 11 and a Z servo circuit 12, a two-dimensional scanning means consisting of an XY fine displacement element 13 and an XY scanning circuit 14, and a data-processing means 15 for converting a measurement signal into a three-dimensional image. A resilient body 16 produces spring pressure that holds the probe 1 to the quartz oscillator 4.

When the probe vibrating horizontally is brought close to the sample surface, a shear force acts on the tip of the probe. This reduces the amplitude of the vibration. The probe and the quartz oscillator are secured together by spring pressure and thus operate as a unit. Therefore, the decrease in the amplitude of the vibration of the probe results in a decrease in the amplitude of the vibration of the quartz oscillator. This in turn reduces the output current, which is detected by the current/voltage amplifier circuit. The distance between the sample and the probe is controlled with the Z fine displacement element and the Z servo circuit to maintain the output current from the quartz oscillator constant. In this way, the tip of the probe is kept at a constant distance from the sample surface. Under this condition, the probe is scanned in two dimensions across the sample plane to produce a three-dimensional image. Under this condition, an electric field, magnetic field, electric current, light, heat, pressure, or the like is applied to the sample surface. Thus, the sample surface can be machined or processed. In addition, information can be recorded by forming a distribution of machining on the sample surface, using a sample-moving means. In addition, the information can be reproduced by successively measuring the information machined into the surface by the use of the sample-moving means.

The distance between the probe and the sample is controlled by the use of a quartz oscillator as described above. This dispenses with a laser normally used for position control such as in a scanning probe microscope employing laser light. In addition, the problem of inaccurate data due to variations in the position of the laser light and variations in the amount of reflected light can be circumvented. The spring pressure of the resilient body anchors the probe to the quartz oscillator. In the prior art probe microscope using a quartz oscillator, data would be affected by the manner in which they are adhesively bonded. In exchanging the probe, it is only necessary, to replace the probe. In consequence, the same quartz can be used. The reproducibility of the measurement conditions and the reproducibility of data can be enhanced. Moreover, the replacement of only the probe gives rise to lower cost. In addition, the adhesive bonding that is difficult to perform is made unnecessary. Consequently, the instrument is made very easy to handle. Further, an apparatus for machining, recording, and reproducing can be accomplished, using the scanning probe microscope, the apparatus being capable of measuring surface topography with good reproducibility. The apparatus have good machining accuracy and recording accuracy and can easily reproduce information.

EMBODIMENTS

Embodiments of this invention are hereinafter described.

Embodiment 1

Figure 4:
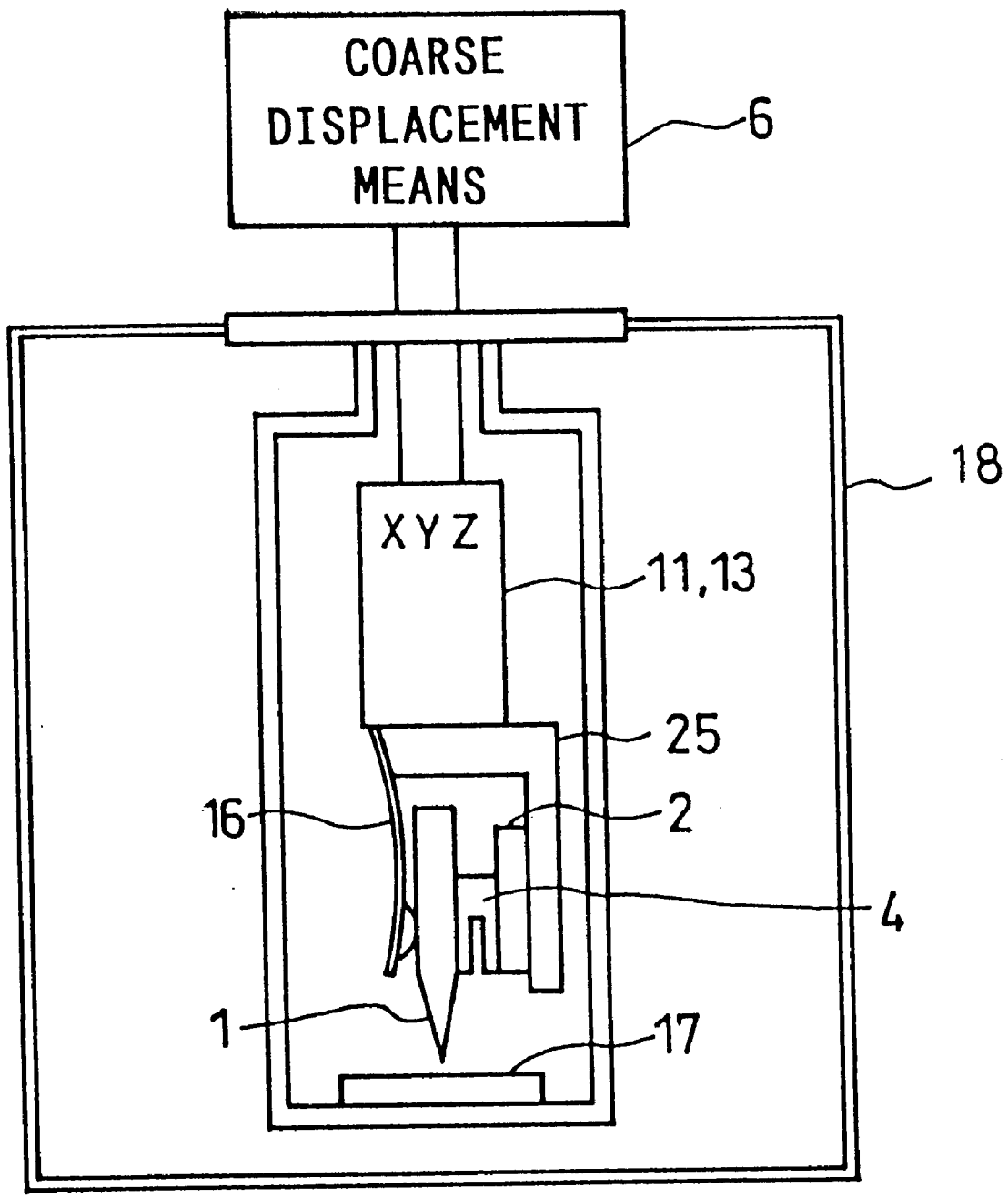
FIG. 4 is a schematic view of Embodiment 1 of a machining, recording, and reproducing apparatus using a scanning probe microscope in accordance with the present invention.

FIG. 4 is a schematic view of Embodiment 1 of apparatus for machining, recording, and reproducing, using a scanning probe microscope in accordance with the invention. The described embodiment is a machining apparatus using a scanning probe microscope and capable of controlling the ambient around the sample. A quartz oscillator 4 and a piezoelectric oscillator 2 are bonded to a quartz oscillator holder 25 with adhesive. A PZT device in the form of a flat plate is used as the piezoelectric oscillator. A quartz oscillator used for a clock or watch is used as the aforementioned quartz oscillator. When an AC voltage is applied to the PZT device, it vibrates, forcing the quartz oscillator to vibrate. If the vibration frequency is made coincident with the resonant frequency (e.g., 32.7 kHz) of the quartz oscillator, the quartz oscillator resonates. Then, piezoelectric effect induces an electric charge on the electrodes of the quartz oscillator. The resulting current is detected by a current/voltage amplifier circuit. Since a current proportional to the amplitude of the vibration of the quartz oscillator is produced, the state of the vibration of the quartz oscillator can be measured from the detected current. A cylindrical PZT scanner, a laminated PZT plate, or other structure may be conceivable as the piezoelectric oscillator, as well as the PZT plate. All of them are embraced by the present invention. Furthermore, quartz oscillators used in applications other than clocks and watches may be used as the quartz oscillator.

A probe 1 is held to the quartz oscillator by spring pressure of a resilient body 16. The used probe is prepared by chemically etching the tip of tungsten and machining it into a tapering form. The probe can be made of metals in this way. It may be conceivable that a cantilever of silicon or silicon nitride, an optical fiber, or a glass pipette is machined into a tapering form to fabricate the probe. This is embraced by the present invention. The tapering method may include mechanical polishing and heating-and-elongating processing, as well as the chemical etching. It may be considered that a magnetic film is deposited on the probe tip to make a magnetic force-sensing probe. In addition, it may be thought that a film of gold or platinum is formed to make a conductive probe. All of them are embraced by the present invention. A leaf spring made of a stainless steel is used as the resilient body. Since the sensitivity of the quartz oscillator to forces is high, it is desired that the spring constant of the resilient body be small. In the present invention, a cantilever spring having a thickness of 100 $\mu$m, a width of 1 mm, and a length of 10 mm is used. Besides, the resilient body may be a leaf spring of phosphor bronze and various kinds of rubber such as silicone rubber. All of them are embraced by the present invention. Furthermore, the body may be held by making use of the resilience of the probe itself. This is also embraced by the invention. Where the body is held by spring pressure, this pressure is measured, utilizing the oscillating characteristics of a quartz oscillator, i.e., Q-value. Where the probe is not held, the Q-value of the quartz oscillator is about 3000, for example. Where the probe is held with a spring, the Q-value is less than 500. A Q-value preferable for the scanning probe microscope is approximately 100 to 400. The spring pressure is adjusted so that the Q-value falls within this range.

The quartz oscillator holder 25 is held to XYZ fine displacement elements 11 and 13. A cylindrical piezoelectric device in which X-, Y-, and Z-axis scanners are combined into a unit is used as each fine displacement element. Besides, a piezoelectric scanner in which Z-axis is separate from X- and Y-axes and electrostrictive devices may be conceivable as the fine displacement elements. These are embraced by the invention. Other conceivable structures include piezo-stages, stages using parallel stages, tripod-type piezoelectric devices in which one-axis piezoelectric devices are mounted on X-, Y-, and Z-axes, respectively, and laminar piezoelectric scanners. All of them are embraced by the present invention.

A coarse displacement means 6 is used to bring the probe close to a sample 17. A coarse displacement means consisting of a stepping motor and a speed-reduction gear, a rough motion screw, or a linear guide is used as the above-described coarse displacement means. Other example of the coarse displacement means may consist of a Z stage to which a stepping motor is added. A further example includes a stage using piezoelectric devices. For instance, it is a stage in which an inchworm mechanism or Z stage is combined with a piezoelectric device. All of them are embraced by the present invention.

The sample is held in a vacuum, using a vacuum chamber 18. In this way, the sample can be retained in a vacuum. The vacuum chamber may be provided with a gas inlet port, and the sample may be exposed to an inert gas or reactive gas. This is also embraced by the present invention. Under this condition, an electric field, magnetic field, electric current, light, heat, pressure, or the like was applied from the tip of the probe to the sample surface. Thus, the sample surface could be machined or processed.

This structure can achieve a machining apparatus capable of measuring surface topography with high reproducibility on the order of nanometers and of performing a machining operation accurately, using a scanning probe microscope.

Embodiment 2

Figure 5:
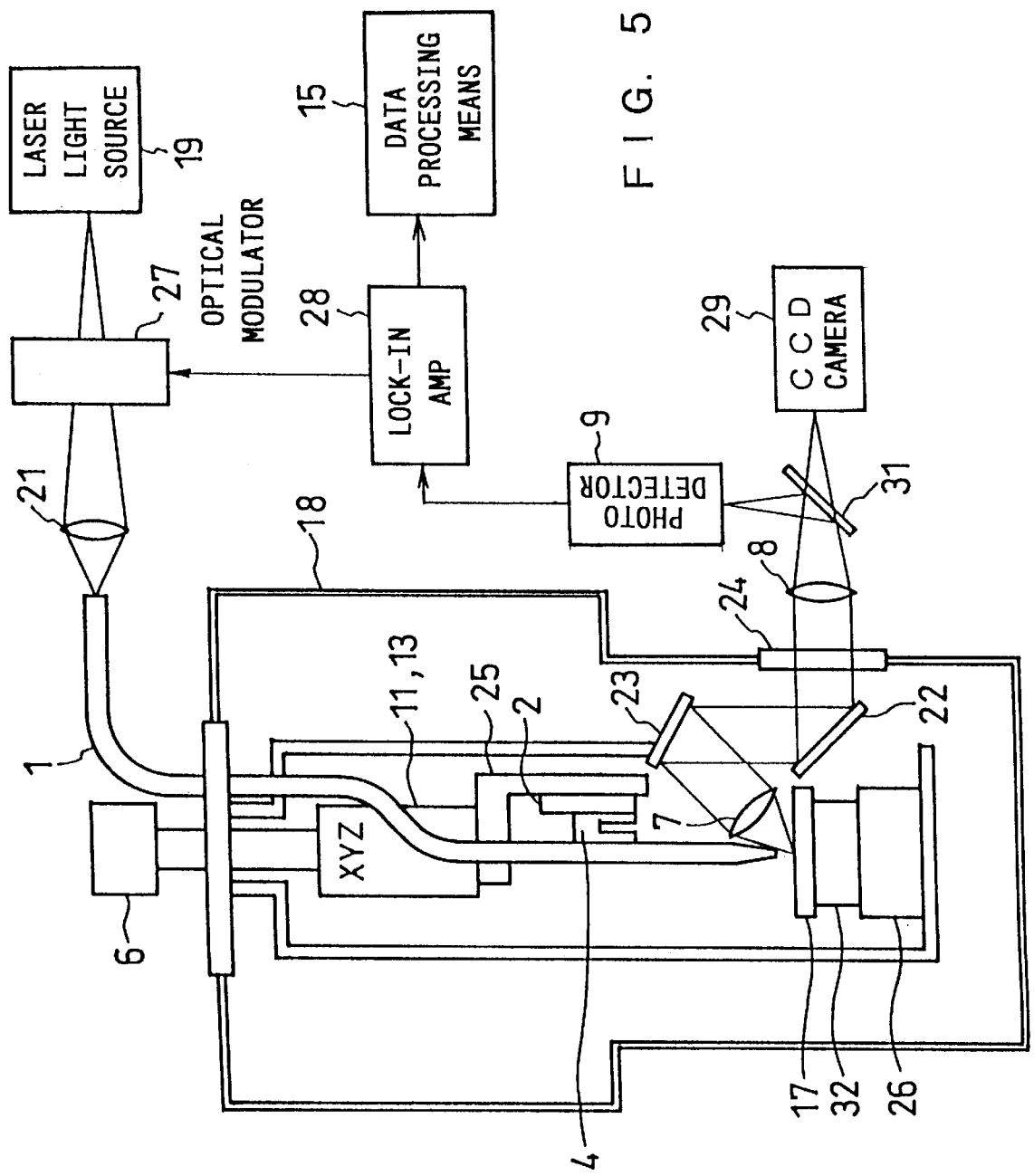
FIG. 5 is a schematic view of Embodiment 2 of a machining, recording, and reproducing apparatus using a scanning probe microscope in accordance with the present invention.

FIG. 5 is a schematic view of Embodiment 2 of an apparatus for machining, recording, and reproducing, using a scanning probe microscope in accordance with the present invention. The described embodiment of the recording and reproducing apparatus is a scanning near-field optical microscope.

Light emitted by a laser light source 19 is amplitude-modulated periodically by an optical modulator 27 consisting of an acoustooptical (AO) modulator. Other conceivable optical modulators include an electro-optic modulator (EO modulator) using an electric field and mechanical modulators in which an optical chopper is rotated by an electric motor. All of them are embraced by the present invention. The modulated laser light is introduced into the probe 1 by a coupling 21. The optical waveguide probe is held to the quartz oscillator 4 by the spring pressure of the probe itself. The light is directed at the sample 17 from the aperture at the tip of the probe. Light reflected off the sample is gathered by a lens 8 via a lens 7, mirrors 23, 22, and an optical window 24. The light is then split into two beams traveling in two directions by a half-mirror 31. The split light beams are measured by a photodetector 9 and a CCD camera 29. In some cases, the half-mirror may be replaced by a dichroic mirror. To secure sufficient amount of light, it may be possible to use no mirrors. The light detected by the photodetector 9 is measured with high S/N, using a lock-in amplifier. The resulting signal is converted into a three-dimensional image by a data-processing means 15. The measured region on the sample surface is moved, using an XY stage 26 for the sample. A piezoelectrically driven stage is used as this XY stage. Other conceivable XY stage may be an XY stage in which a stepping motor is combined with an XY stage. This is also embraced by the present invention. A heater 32 was used to heat the sample. The heater consisted of a wire of manganin wound around a sample stage of copper. Heating is done while controlling the current fed to the heater. Conceivable examples of the heater include tungsten wire, carbon thin film, and manganin thin film. All of them are embraced by the present invention. Using the structure described thus far, laser light is directed at the sample surface from the aperture less than the wavelength of the optical waveguide probe while varying the sample temperature from the low temperature of room temperature to a high temperature. The reflected light was gathered by lenses and detected by the photodetector. The surface topography could be measured with high reproducibility on the order of nanometers by scanning the optical waveguide probe across the sample plane. At the same time, the distribution of reflected light within the sample plane could be measured with high resolution less than the wavelength. Information could be recorded on the sample surface by applying an electric field, magnetic field, electric current, light, heat, pressure, or the like. In addition, the recorded information can be reproduced by measuring it.

The structure described thus far has accomplished a recording-and-reproducing apparatus that is capable of measuring surface topography with high reproducibility on the order of nanometers and capable of accurate recording and reproduction.

As described thus far, this invention comprises: a probe 1 equipped with a probe tip at its front end, a vibration application portion consisting of a piezoelectric vibrating body 2 and an AC voltage-generating portion 3, a vibration-detecting portion consisting of a quartz oscillator 4 and a current/voltage amplifier circuit 5, a coarse displacement means 6 for bringing the probe close to a surface of a sample, a sample-to-probe distance control means consisting of a Z fine displacement element 11 and a Z servo circuit 12, a two-dimensional scanning means consisting of an XY fine displacement element 13 and an XY scanning circuit 14, and a data-processing means 15 for converting a measurement signal into a three-dimensional image. The probe 1 is held to the quartz oscillator 4 by spring pressure of a resilient body 16.

As described above, the distance between the probe and the sample is controlled, using the quartz oscillator. This dispenses with position controlling laser which would normally be used in a scanning probe microscope using laser light. In addition, the problem of inaccurate data due to variations in the position of the laser light and due to variations in the amount of reflected light can be circumvented. The spring pressure of the resilient body anchors the probe to the quartz oscillator. In the prior art probe microscope using a quartz oscillator, data would be affected by the manner in which they are adhesively bonded. In exchanging the probe, it is only necessary to replace the probe. In consequence, the same quartz can be used. The reproducibility of the measurement conditions and the reproducibility of data can be enhanced. Moreover, the replacement of only the probe gives rise to lower cost. In addition, the adhesive bonding that is difficult to perform is made unnecessary. Consequently, the instrument is made very easy to handle. In this way, a scanning probe microscope with high reproducibility can be accomplished. Also, a machining, recording, and reproducing apparatus using the scanning probe microscope having high machining accuracy and high recording accuracy can be realized, the apparatus being capable of reproducing information easily.

What is claimed is:

1. In combination with a machining apparatus, a scanning probe microscope comprising:
    a probe having a probe tip extending in a Z direction; a vibration device having a piezoelectric vibrating body and an AC voltage generator for vibrating the probe tip relative to a surface of a sample; a vibration detecting device having a quartz oscillator and a current/voltage amplifier circuit for detecting vibration of the probe tip; a resilient body for biasing the probe into pressure contact with the quartz oscillator; a coarse displacement device for effecting coarse displacement of the probe in the Z direction to bring the probe tip close to the surface of the sample; a sample-to-probe distance control device having a fine displacement element and a servo circuit for effecting fine displacement of the probe tip in the Z direction; a two-dimensional scanning device having a fine displacement element and a scanning circuit for scanning the probe in X and Y directions to generate a measurement signal; and a data processing device for converting the measurement signal into a three-dimensional image.

2. A machining apparatus as set forth in claim 1; wherein the probe comprises an STM (scanning tunneling microscope) tip.

3. A machining apparatus as set forth in claim 1; wherein the probe comprises an AFM (atomic force microscope) cantilever.

4. A machining apparatus as set forth in claim 3; wherein the cantilever comprises a cantilever of a magnetic force microscope and is composed of a magnetic substance.

5. A machining apparatus as set forth in claim 3; wherein the cantilever comprises a conductive cantilever; and further comprising means for applying an electric potential to the sample surface.

6. A machining apparatus as set forth in claim 1; further comprising means for holding the sample in a vacuum.

7. A machining apparatus as set forth in claim 1; further comprising means for holding the sample in an inert gas or reactive gas.

8. A machining apparatus as set forth in claim 1; further comprising a sample stage for moving a measurement position on the sample surface.

9. A machining apparatus as set forth in claim 1; further comprising means for illuminating the surface of the sample with light.

10. A machining apparatus as set forth in claim 9; further comprising means for collecting and detecting light transmitted through the sample or light reflected off the surface of the sample.

11. A machining apparatus as set forth in claim 10; further comprising means for periodically modulating the light illuminated on the surface of the sample, and lock-in detecting means for measuring the light detected by the means for collecting and detecting light.

12. In combination with a recording-and-reproducing apparatus, a scanning probe microscope comprising: a probe having a probe tip extending in a Z direction; a vibration device having a piezoelectric vibrating body and an AC voltage generator for vibrating the probe tip relative to a surface of a sample; a vibration detecting device having a quartz oscillator and a current/voltage amplifier circuit for detecting vibration of the probe tip; a resilient body for biasing the probe into pressure contact with the quartz oscillator; a coarse displacement device for effecting coarse displacement of the probe in the Z direction to bring the probe tip close to the surface of the sample; a sample-to-probe distance control device having a fine displacement element and a servo circuit for effecting fine displacement of the probe tip in the Z direction; a two-dimensional scanning device having a fine displacement element and a scanning circuit for scanning the probe in X and Y directions to generate a measurement signal; and a data processing device for converting the measurement signal into a three-dimensional image.

13. A recording-and-reproducing apparatus as set forth in claim 12; wherein the probe comprises an STM (scanning tunneling microscope) tip.

14. A recording-and-reproducing apparatus as set forth in claim 12; wherein the probe comprises an AFM (atomic force microscope) cantilever.

15. A recording-and-reproducing apparatus as set forth in claim 14; wherein the cantilever comprises a cantilever of a magnetic force microscope and is composed of a magnetic substance.

16. A recording-and-reproducing apparatus as set forth in claim 14; wherein the cantilever comprises a conductive cantilever and further comprising means for applying an electric potential to the sample surface.

17. A recording-and-reproducing apparatus as set forth in claim 12; further comprising means for holding the sample in a vacuum.

18. A recording-and-reproducing apparatus as set forth in claim 12; further comprising means for holding the sample in an inert gas or reactive gas.

19. A recording-and-reproducing apparatus as set forth in claim 12; further comprising a sample stage for moving a measurement position on the sample surface.

20. A recording-and-reproducing apparatus as set forth in claim 12; further comprising means for illuminating the surface of the sample with light.

21. A recording-and-reproducing apparatus as set forth in claim 20; further comprising means for collecting and detecting light transmitted through the sample or light reflected off the surface of the sample.

22. A recording-and-reproducing apparatus as set forth in claim 21; further comprising means for periodically modulating the light illuminated on the surface of the sample, and lock-in detecting means for measuring the light detected by the means for collecting and detecting light.

23. In combination with a machining apparatus, a scanning probe microscope comprising: a probe extending in a Z direction; vibrating means for vibrating the probe relative to a surface of a sample; vibration detecting means for detecting the probe vibration; biasing means for biasing the probe into pressure contact with the vibration detecting means; means for effecting coarse displacement of the probe in the Z direction; means for effecting fine displacement of the probe in the Z direction; means for scanning the probe in X and Y directions relative to the surface of the sample and generating a measurement signal; and processing means for processing the measurement signal into a three-dimensional image.

24. A scanning probe microscope according to claim 23; wherein the vibration detecting means comprises a quartz oscillator; and wherein the probe is integrally connected to the quartz oscillator by the pressure applied to the probe by the biasing means.

25. A scanning probe microscope according to claim 24; wherein the biasing means comprises a leaf spring.

26. A scanning probe microscope according to claim 23; wherein the vibrating means comprises a piezoelectric vibrating body and an AC voltage generator.

27. In combination with a recording-and-reproducing apparatus, a scanning probe microscope comprising: a probe extending in a Z direction; a piezoelectric vibrating body for vibrating the probe relative to a surface of a sample; a vibration detecting device having a quartz oscillator for detecting the probe vibration; a biasing member for biasing the probe into pressure contact with the quartz oscillator of the vibration detecting device to integrally connect the probe to the quartz oscillator; a coarse displacement device for effecting coarse displacement of the probe in the Z direction; a fine displacement device for effecting fine displacement of the probe in the Z direction; and a scanning device for scanning the probe in X and Y directions relative to the surface of the sample.

28. A scanning probe microscope according to claim 27; wherein the biasing member comprises a leaf spring.

* * * * *